(12) United States Patent
Szabela

(10) Patent No.: US 6,923,288 B2
(45) Date of Patent: Aug. 2, 2005

(54) ELECTRIC STEERING APPARATUS

(75) Inventor: William A. Szabela, Brookston, IN (US)

(73) Assignee: TRW Inc., Lyndhurst, OH (US)

( * ) Notice: Subject to any disclaimer, the term of this patent is extended or adjusted under 35 U.S.C. 154(b) by 98 days.

(21) Appl. No.: 10/239,798

(22) PCT Filed: Mar. 29, 2001

(86) PCT No.: PCT/US01/40392

§ 371 (c)(1),
(2), (4) Date: Dec. 4, 2002

(87) PCT Pub. No.: WO01/74645

PCT Pub. Date: Oct. 11, 2001

(65) Prior Publication Data

US 2004/0020708 A1 Feb. 5, 2004

(51) Int. Cl.[7] ................................................. B62D 5/00
(52) U.S. Cl. ....................................... 180/402; 180/403
(58) Field of Search .................................. 180/443, 446, 180/402, 403

(56) References Cited

U.S. PATENT DOCUMENTS

| | | | |
|---|---|---|---|
| 4,830,127 A | | 5/1989 | Ito et al. |
| 4,860,844 A | | 8/1989 | O'Neil |
| 4,865,144 A | | 9/1989 | North |
| 5,228,757 A | | 7/1993 | Ito et al. |
| 5,247,441 A | | 9/1993 | Serizawa et al. |
| 5,251,135 A | | 10/1993 | Serizawa et al. |
| 5,282,135 A | * | 1/1994 | Sato et al. ...................... 701/43 |
| 5,327,986 A | * | 7/1994 | Saita ............................ 180/446 |
| 5,347,458 A | | 9/1994 | Serizawa et al. |
| 5,409,074 A | | 4/1995 | Wilson et al. |
| 5,511,629 A | | 4/1996 | Vogel |
| 5,709,281 A | | 1/1998 | Sherwin et al. |
| 5,785,144 A | | 7/1998 | Cakmaz et al. |
| 5,828,972 A | * | 10/1998 | Asanuma et al. ............. 701/41 |
| 5,880,367 A | | 3/1999 | Vaughn |
| 5,925,083 A | | 7/1999 | Ackermann |
| 6,059,068 A | | 5/2000 | Kato et al. |
| 6,097,286 A | | 8/2000 | Discenzo |
| 6,098,296 A | | 8/2000 | Perisho, Jr. et al. |
| 6,118,246 A | | 9/2000 | Eyerly |
| 6,176,341 B1 | * | 1/2001 | Ansari ........................ 180/402 |
| 6,208,923 B1 | * | 3/2001 | Hommel ...................... 701/42 |
| 6,370,460 B1 | * | 4/2002 | Kaufmann et al. ........... 701/41 |
| 6,394,218 B1 | * | 5/2002 | Heitzer ....................... 180/402 |
| 6,554,094 B1 | * | 4/2003 | Bell et al. ................... 180/402 |

FOREIGN PATENT DOCUMENTS

WO  WO0174645 A1  10/2001

* cited by examiner

Primary Examiner—Daniel G. DePumpo
(74) Attorney, Agent, or Firm—Tarolli, Sundheim, Covell & Tummino, L.L.P.

(57) ABSTRACT

A steering apparatus (10) for a vehicle having steerable wheels. The apparatus (10) comprises a rotatable vehicle steering wheel (12) and a first assembly (100) operatively coupled to the steering wheel. The first assembly (100) includes a sensor (30) for sensing applied torque and angular position of the steering wheel (12) and a first electronic control unit (50) for generating a first signal corresponding to the sensed torque and angular position of the steering wheel. A second assembly (100) is operatively coupled to the steerable wheels. The second assembly (100) includes a second electronic control unit (110) for receiving the first signal, a first electric motor (120) controlled by the second electronic control unit, and a steering gear (130) which is actuated by the first electric motor (120) to turn the steerable wheels of the vehicle. A signal transmitting conductor (250) transmits the first signal to the second electronic control unit (110).

6 Claims, 6 Drawing Sheets

ELECTRIC STEERING APPARATUS

TECHNICAL FIELD

The present invention relates to an electric steering apparatus for steering a vehicle.

BACKGROUND OF THE INVENTION

Integral hydraulic power steering gears are commonly used in trucks, heavy equipment such as earth-moving vehicles, and construction vehicles. "Integral" refers to a steering gear containing a manual steering mechanism, a hydraulic control valve assembly, and a hydraulic power cylinder integrated into a single unit.

The hydraulic power cylinder typically comprises a chamber divided into two chamber portions by a piston. The piston has a set of teeth which mesh with a sector gear fixed to an output shaft. The output shaft is connected via steering linkage to steerable wheels of a vehicle to steer the vehicle when the output shaft is rotated.

The hydraulic control valve assembly controls the flow of pressurized hydraulic fluid between a hydraulic pump and one of the chamber portions to control the direction and amount of steering. The valve assembly typically comprises two relatively rotatable valve elements, one of which is connected to a rotatable input shaft operatively coupled to the vehicle steering wheel. The other valve element is connected with a follow-up member, such as a ball screw drive, which rotates in response to movement of the piston. The ball screw drive provides a direct connection between the input shaft and the piston to allow for manual steering of the vehicle in the event of hydraulic fluid pressure loss.

In the typical integral hydraulic power steering gear, the input shaft is connected to the vehicle steering wheel by one or more intermediate shafts. The intermediate shafts are usually long and can be prone to excessive lash. The required routing of the intermediate shaft also restricts the placement of the steering gear components and other components on the vehicle. It is desirable to eliminate the intermediate shaft from the vehicle steering system. If the intermediate shaft is eliminated, there is no mechanical connection between the steering wheel and the steering gear. Such systems are known, and are commonly referred to as "steer-by-wire" systems.

Because there is no mechanical connection between the steering wheel and the steering gear, redundancy in steer-by-wire systems may be desirable for fail-safe reasons.

It is also known to use an electrically powered steering apparatus to turn the steerable wheels instead of a hydraulically powered steering gear. One known electric steering apparatus for turning the steerable vehicle wheels includes a ball nut for transmitting force between an electric motor and an axially movable member. Upon actuation of the electric motor, the ball nut is driven to rotate relative to the member. The rotational force of the ball nut is transmitted to the member by balls to drive the member axially. Axial movement of the member effects turning movement of the steerable wheels.

In another known electric power steering apparatus, an electric motor is connected with gearing which provides a gear reduction between an electric motor shaft and an output pinion meshed with an axially movable member. Rotation of the output pinion by the electric motor causes the member to move axially to turn the steerable wheels.

SUMMARY OF THE INVENTION

The present invention is a steering apparatus for a vehicle having steerable wheels. In accordance with one feature of the present invention the apparatus comprises a rotatable vehicle steering wheel and a first assembly operatively coupled to the steering wheel. The first assembly includes a sensor for sensing applied torque and angular position of the steering wheel and a first electronic control unit for generating a first signal corresponding to the sensed torque and position of the steering wheel. A second assembly is operatively coupled to the steerable wheels. The second assembly includes a second electronic control unit for receiving the first signal, a first electric motor controlled by the electronic control unit, and a hydraulic steering gear which is actuated by the first electric motor to turn the steerable wheels of the vehicle. A signal transmitting conductor transmits the first signal to the second electronic control unit. In accordance with a preferred embodiment, the first signal comprises an optical signal and the signal transmitting conductor comprises a fiber optic cable.

In accordance with another feature of the present invention an apparatus for turning steerable wheels of a vehicle in response to turning of a steering wheel of the vehicle comprises a sensor for sensing steering wheel torque/position and for providing a first output signal indicative of steering wheel torque/position. A steering gear is actuatable to turn at least one steerable wheel of the vehicle. A dual drive electric motor is energizable to actuate the steering gear. The motor has a first set of windings and a second set of windings. The first set of windings energizes the motor to actuate the steering gear independent of the second set of windings. The second set of windings energizes the motor to actuate the steering gear independent of the first set of windings. An electronic control unit receives the first output signal and controls electrical current flow through the first and second sets of windings.

In accordance with yet another feature of the present invention an apparatus comprises a rotatable vehicle steering wheel and a first assembly operatively coupled to the steering wheel. The first assembly includes a sensor for sensing applied torque and angular position of the steering wheel and a first electronic control unit for generating a first signal corresponding to the aforementioned parameters. A second assembly is operatively coupled to the steerable wheels. The second assembly includes a second electronic control unit for receiving the first signal, a first electric motor controlled by the second electronic control unit, and a steering gear which is actuated by the first electric motor to turn the steerable wheels of the vehicle. The steering gear includes an axially movable member and a rotatable ball nut rotatable by the first electric motor. Rotation of the ball nut transmits force to the axially movable member to axially move the movable member to turn the steerable wheels. A signal transmitting conductor transmits the first signal from the first electronic control unit to the second electronic control unit. Preferably, the first signal comprises an optical signal and the signal transmitting conductor comprises a fiber optic cable.

BRIEF DESCRIPTION OF THE DRAWINGS

The foregoing and other features of the present invention will become apparent to one skilled in the art to which the present invention relates upon reading the following description of the invention with reference to the accompanying drawings, in which.

DESCRIPTION OF PREFERRED EMBODIMENTS

Figure 1:
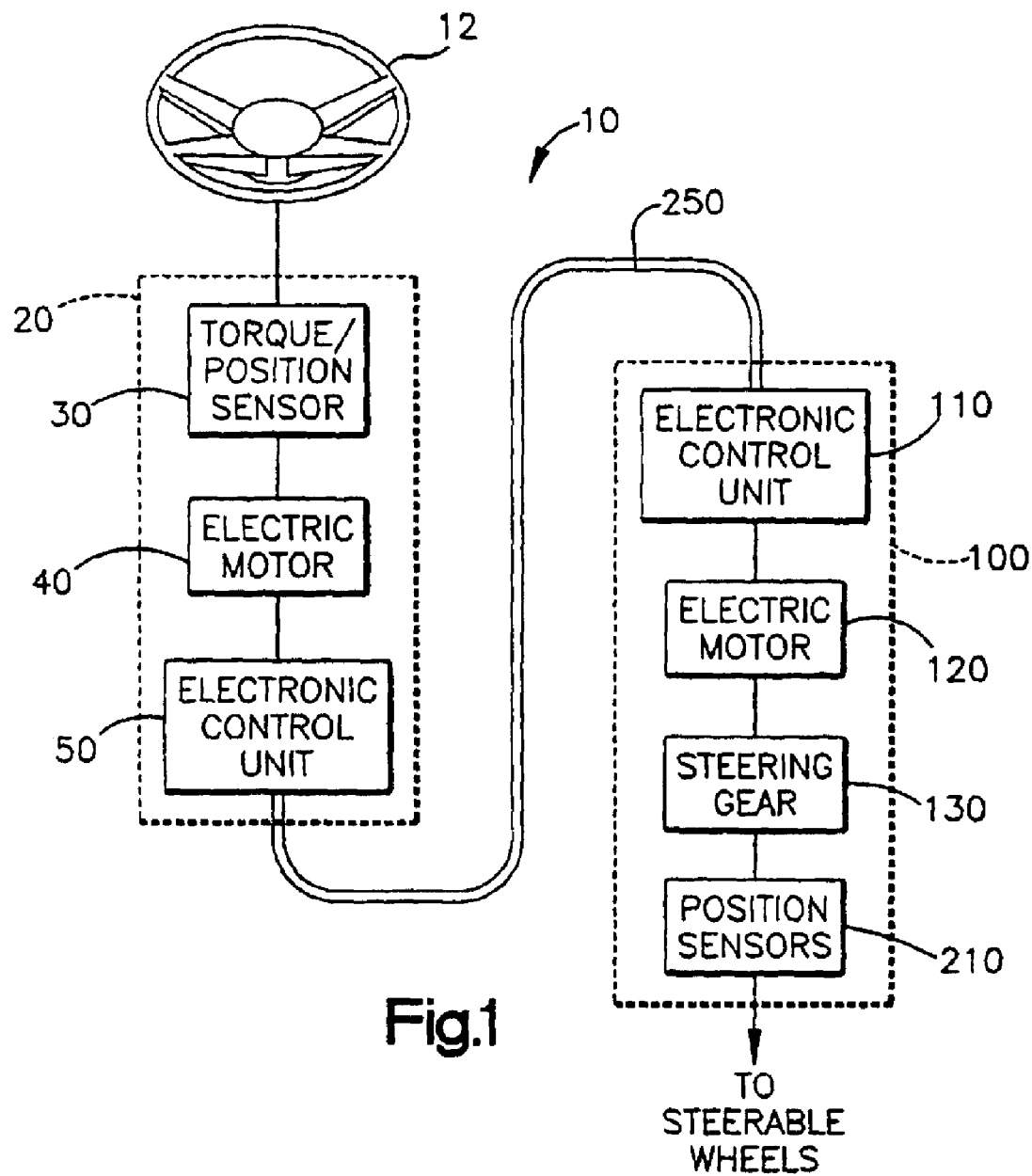
FIG. 1 is a schematic block diagram of a vehicle steering apparatus constructed in accordance with the present invention.

The present invention is an electric steering apparatus for steering a vehicle. As representative of an embodiment of the present invention, FIG. 1 schematically illustrates a steering apparatus 10. The steering apparatus 10 comprises a vehicle steering wheel 12, a first assembly 20, a second assembly 100 operatively coupled to steerable wheels (not shown) of a vehicle, and a signal transmitting conductor 250 extending between the first and second assemblies. The vehicle steering wheel 12 is of known construction and is manually rotatable by a vehicle operator. The first assembly 20 is operatively coupled to the vehicle steering wheel 12 in a known manner (not shown).

The first assembly 20 includes a torque/position sensor 30, an electric motor 40, and a first electronic control unit 50. These three components of the first assembly 20 are integrated into a single unit. The torque/position sensor 30, shown only schematically in FIG. 1, is operable to sense applied torque and rotation of the steering wheel 12 by the operator. The torque/position sensor 30 preferably comprises an optical sensor having relatively rotatable first and second disks (not shown). Two sets of light emitters (not shown) are positioned to emit light toward the disks. Two sets of light receivers (not shown) are positioned to receive light that shines through the disks. The sensor 30 is able to determine the applied torque to the steering wheel and the angular position of the steering wheel based on the received light. It is contemplated that the torque/position sensor 30 could be some other type of sensor, rather than an optical sensor. It is further contemplated that the first assembly 20 could include one or more additional torque/position sensors 30 in order to have redundancy in case a problem develops with the primary position sensor.

The electric motor 40, hereinafter referred to as the steering feel motor, is operatively coupled to the steering wheel 12 to provide resistance to rotation of the steering wheel and thereby provide steering feel to the vehicle operator. The steering feel motor 40 is controlled by the first electronic control unit 50 in response to signals received from the second assembly 100 as described further below.

The electronic control unit 50 is operable to generate a first signal corresponding to the sensed torque and angular rotation of the steering wheel 12 sensed by the torque/position sensor 30. Further, the first electronic control unit 50 has multiplexing capability and is operable to send the first signal to the second assembly 100 via the signal transmitting conductor 250. Preferably, the first signal is an optical signal and the signal transmitting conductor 250 is a high speed fiber optic cable.

The second assembly 100 includes a second electronic control unit 110, an electric motor 120, and a hydraulic power steering gear 130 for turning the steerable wheels to effect steering of the vehicle. These three components of the second assembly 100 are integrated into a single unit in order to minimize the number of electrical contacts and maximize reliability. The second electronic control unit 110 is operable to receive the first signal transmitted by the fiber optic cable 250. The second electronic control unit 110 is further operable to control the electric motor 120 based on the first signal. The electric motor 120 has an output shaft (not shown) which drives the hydraulic steering gear 130.

The steering gear 130 is an integral hydraulic power steering gear and includes a two-piece housing 132 (FIG. 2) having a hydraulic power cylinder 134. The power cylinder 134 comprises a chamber 136 divided into two chamber portions 138 and 140, respectively, by a piston 142. The piston 142 includes an inner bore 143 with a helical groove 144. The piston 142 also has a set of external teeth 145 which mesh with a sector gear 146. The sector gear 146 is fixed to an output shaft 148 which extends outwardly from the housing 132. The output shaft 148 is connected to a pitman arm (not shown) which, in turn, is connected via steering linkage (not shown) to the steerable wheels to steer the vehicle. As the piston 142 moves in the chamber 136, the output shaft 148 is rotated to operate the steering linkage, which turns the steerable wheels of the vehicle.

A hydraulic control valve assembly 150 controls the flow of pressurized hydraulic fluid between a hydraulic circuit including a hydraulic pump (not shown) and one of the chamber portions 138 and 140 to control the direction and amount of steering. The valve assembly 150 is actuated by a rotatable input shaft 152. The input shaft 152 is rotated by the electric motor 120.

The valve assembly 150 comprises first and second valve members 154 and 156, respectively. The first valve member 154 comprises a valve core 160 and the second valve member 156 comprises a valve sleeve 162. The valve core 160 is located coaxially within the valve sleeve 162 and is supported for rotation by the valve sleeve. The valve core 160 is formed integrally as one piece with the input shaft 152. The valve core 160 has oppositely disposed first and second end portions 164 and 166, respectively, and a valve section 168 between the end portions. The first end portion 164 of the valve core 160 projects beyond the valve sleeve 162 and the second end portion 166 of the valve core lies within the valve sleeve.

The valve section 168 of the valve core 160 has a plurality of circumferentially spaced, axially extending grooves 170 as is known in the art. A first portion of the grooves 170 are fluidly connected with an internal passage 172 extending from the valve section 168 of the valve core 160 to the second end portion 166. The internal passage 172 communicates via passages (not shown) with the return line of a hydraulic pump circuit (not shown). A second portion of the grooves 170 are in fluid communication with a plurality of passages 174 in the valve sleeve 162.

The valve sleeve 162 has oppositely disposed first and second ends 180 and 182, respectively. The valve sleeve 162 further includes a sleeve section 184 adjacent the first end 180 and a ball screw section 186 adjacent the second end 182. An axially extending passage 188 extends from the first end 180 of the valve sleeve 162 through the sleeve section 184 and the ball screw section 186 to the second end 182.

The first end 180 of the valve sleeve 162 includes first and second lugs (not shown) that are disposed in diametrically opposed cut-outs (not shown) in the valve core 160. Upon rotation of the valve core 160 of between 2° and 8° relative to the valve sleeve 162, the lugs engage the cut-outs in the valve core to cause the valve sleeve to be rotated along with the valve core. Such rotation of the valve sleeve 162 causes the piston 142 to move axially in the chamber 136 and, hence, allows for manual steering of the vehicle even if a loss in hydraulic fluid pressure has occurred.

The sleeve section 184 of the valve sleeve 162 includes the plurality of passages 174 (FIG. 2) which extend from the outer circumference of the sleeve section to the inner circumference. The passages 174 communicate with an annular chamber 190 in the housing 132 which is fluidly connected to the hydraulic pump. A plurality of axially extending grooves 192 are formed in the inner surface of the valve sleeve 162 as is known in the art. The grooves 192 fluidly communicate with the second portion of the grooves 170 in the valve core 160. Further, a first portion of the grooves 192 in the valve sleeve 162 are fluidly connected via passages (not shown) with the first chamber portion 138 in the housing 132, and a second portion of the grooves 192 fluidly connected via passages (not shown) with the second chamber portion 140 in the housing. As is known in the art, when the valve core 160 is rotated relative to the valve sleeve 162, hydraulic fluid is ported through the grooves 170 and 192 and associated passages to one of the chamber portions 138 and 140, while the hydraulic fluid is vented from the other chamber portion 132, thereby causing the piston 132 to move accordingly.

The ball screw section 186 of the valve sleeve 162 includes a helical groove 194 formed on its outer periphery. A plurality of balls 196 are located in the helical groove 140. The balls 196 are also located in the helical groove 144 in the bore 143 formed in the piston 142. As is well known in the art, axial movement of the piston 142 causes the ball screw portion 186 to rotate which, in turn, causes the rest of the valve sleeve 162 to rotate.

A torsion bar 198 connects the valve core 160 and the valve sleeve 162. One end of the torsion bar 198 is connected by a pin 200 to the valve section 168 of the valve core 160, while the other end of the torsion bar extends through the passage 188 in the valve sleeve 162 and is connected by a pin 202 adjacent the second end 182 of the valve sleeve.

The hydraulic steering gear 130 further includes a plurality of output position sensors 210 for sensing rotation of the output shaft 148. The position sensors 210 are non-contacting position sensors. Multiple output position sensors 210 are used for redundancy purposes. The second electronic control unit 110 is operable to generate a second signal corresponding to the rotation of the steering gear output shaft 148 sensed by the position sensors 210. Further, the second electronic control unit 110 has multiplexing capability and is operable to send the second signal to the first assembly 30 via the fiber optic cable 250. In accordance with the preferred embodiment, the second signal is an optical signal.

The second signal is received by the first electronic control unit 50. The first electronic control unit 50 controls the steering feel motor 40 in response to the second signal. The multiplexing capability of the first and second electronic control units 50 and 110 allows the first and second signals to be transmitted practically simultaneously using the fiber optic cable 250. The electronic control units 50 and 110 can vary the intensity of the first and second signals and/or the frequency/phase of the signals in order to constantly exchange signal information during operation of the vehicle.

The second signal thus provides feedback to the vehicle operator, in the form of resistance to rotation of the steering wheel 12 by the steering feel motor 40, of the actual position of the steerable wheels upon manual rotation of the steering wheel. In addition, the first electronic control unit 50 could be programmed to increase the resistance to rotation of the steering wheel 12 with vehicle speed.

It is contemplated that the apparatus 10 could include one or more additional assemblies, similar to the second assembly 100, so that each steerable wheel has its own steering gear 130 in order to provide "perfect Ackermann" steering.

Figure 2:
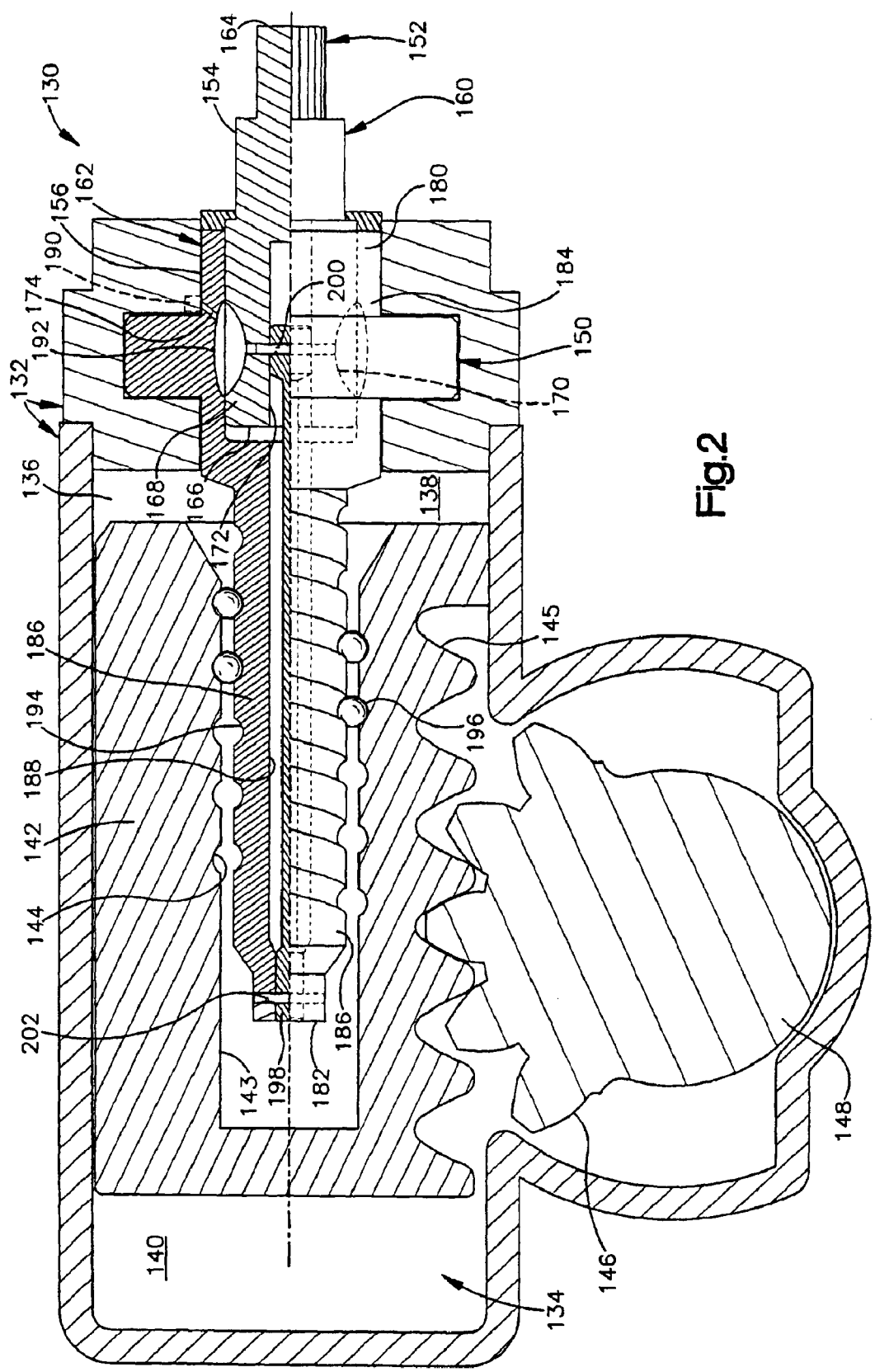
FIG. 2 is a sectional view through a component of the steering apparatus of FIG. 1.

From the above description of the embodiment of FIGS. 1–2, those skilled in the art will perceive improvements and changes. For example, ordinary electrical signals and appropriate wiring could be used to exchange steering position information between the first and second assemblies in place of the optic signals and fiber optic cable discussed above. Also, instead of the plurality of output position sensors 210 for sensing rotation of the output shaft, a plurality of sensors (not shown) may be used to sense the rotation of the input shaft 152.

Figure 3:
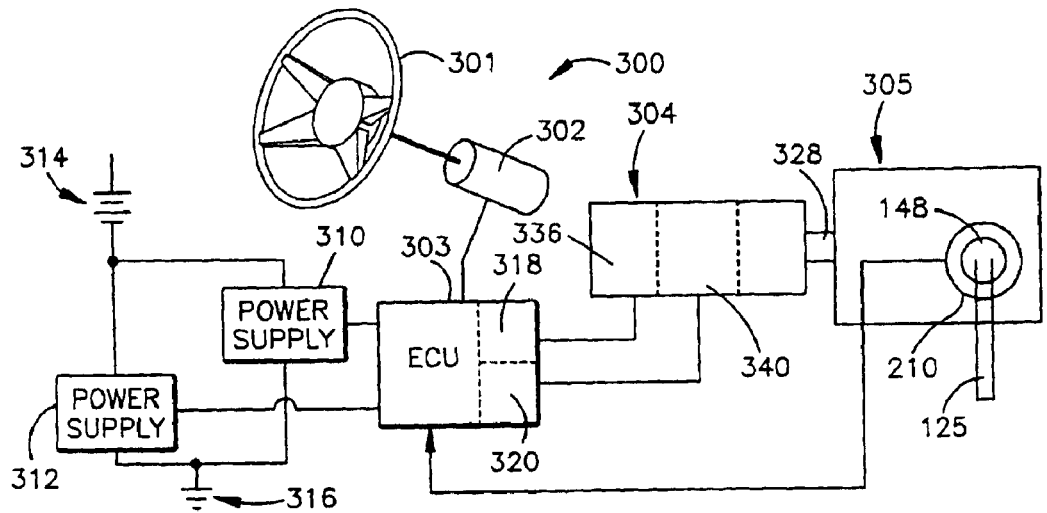
FIG. 3 is a schematic block diagram of a vehicle steering apparatus constructed in accordance with a second embodiment of the present invention.
Figure 5:
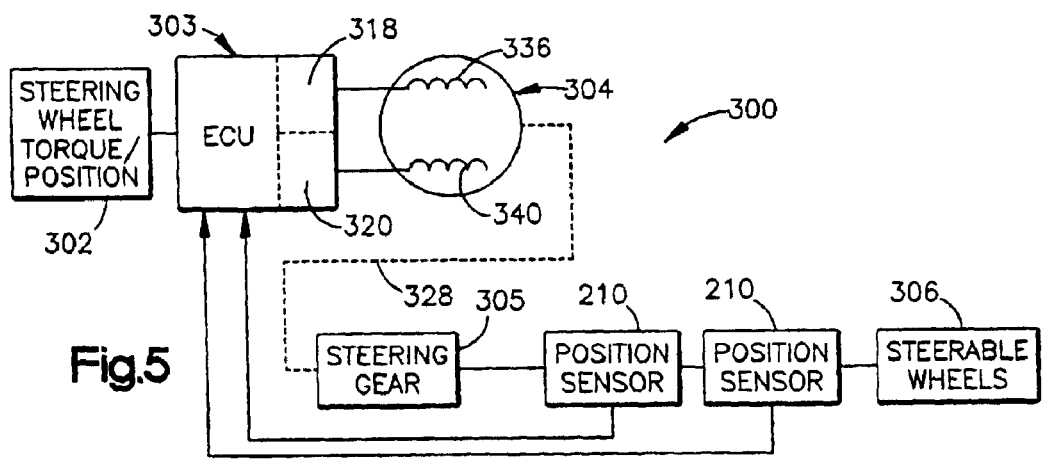
FIG. 5 is another schematic block diagram of the steering apparatus of FIG. 3.

As representative of a second embodiment of the present invention, FIG. 3 schematically illustrates a steering apparatus 300. The steering apparatus 300 comprises a vehicle steering wheel 301, a torque/position sensor 302, an electronic control unit 303, an electric motor 304, a steering gear 305, and steerable wheels 306 (FIG. 5). The steering apparatus 300 is a steer-by-wire system. Thus, there is no mechanical connection between the steering wheel 301 and the steering gear 305 as is described below.

The steering wheel 301 is manually rotatable by a vehicle driver to initiate turning of the vehicle. The torque/position sensor 302 is operatively coupled with the steering wheel 301. The torque/position sensor 302 is operable to sense applied torque and angular position of the steering wheel 301 and to generate a first signal indicative of the aforementioned parameters. The torque/position sensor 302 preferably comprises a known optical sensor, but could alternatively comprise another suitable type of sensor. It is contemplated that the apparatus 300 could include a second torque/position sensor 302 for redundancy purposes.

The electronic control unit (ECU) 303 is operatively coupled with the torque/position sensor 302 and receives the first signal. The ECU 303 includes first and second power supplies 310 and 312 (FIG. 3) for redundancy purposes. The power supplies 310 and 312 are operatively coupled in parallel with a vehicle battery 314 and a vehicle ground 316. The ECU 303 further includes first and second drive circuits 318 and 320. The ECU 303, through one or both of the drive circuits 318 and 320, controls the flow of electrical current to the electric motor 304 based on the first signal.

Figure 4:
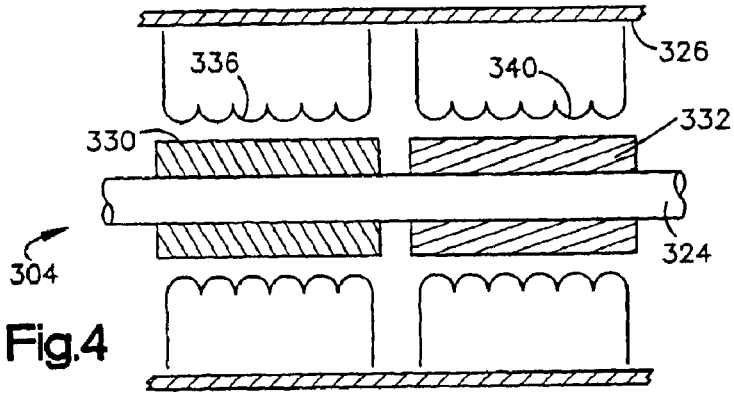
FIG. 4 is a schematic sectional view of a component of the steering apparatus of FIG. 3.

The electric motor 304 is a three phase brushless motor having a rotor 324 (FIG. 4) and a stator 326. An output shaft 328 (FIG. 3) is connected to one end of the rotor 324. A first set of permanent magnets 330 are mounted on the rotor 324 and extend in an annular array. A second set of permanent magnets 332 also extend in an annular array about the rotor 324. The second set of magnets 332 is spaced axially from the first set of magnets 330.

A first set of windings 336 is secured to the stator 326 in the electric motor 304. The first set of windings 336 align radially with the first set of magnets 330 on the rotor 324. The first set of windings 336 are energizable by current from the first drive circuit 318 in the ECU 303 to cause the rotor 324 to rotate. A second set of windings 340 is secured to the stator 326 in the electric motor 304. The second set of windings 340 align radially with the second set of magnets 332 on the rotor 324. The second set of windings 340 are energizable by current from the second drive circuit 320 in the ECU 303 to cause the rotor 324 to rotate. The first and second sets of windings 336 and 340 can be independently energized by the first and second drive circuits 318 and 320, respectively, and thus provide the electric motor 304 with dual drive capability, with the ECU 303 providing electronic commutation.

Figure 6:
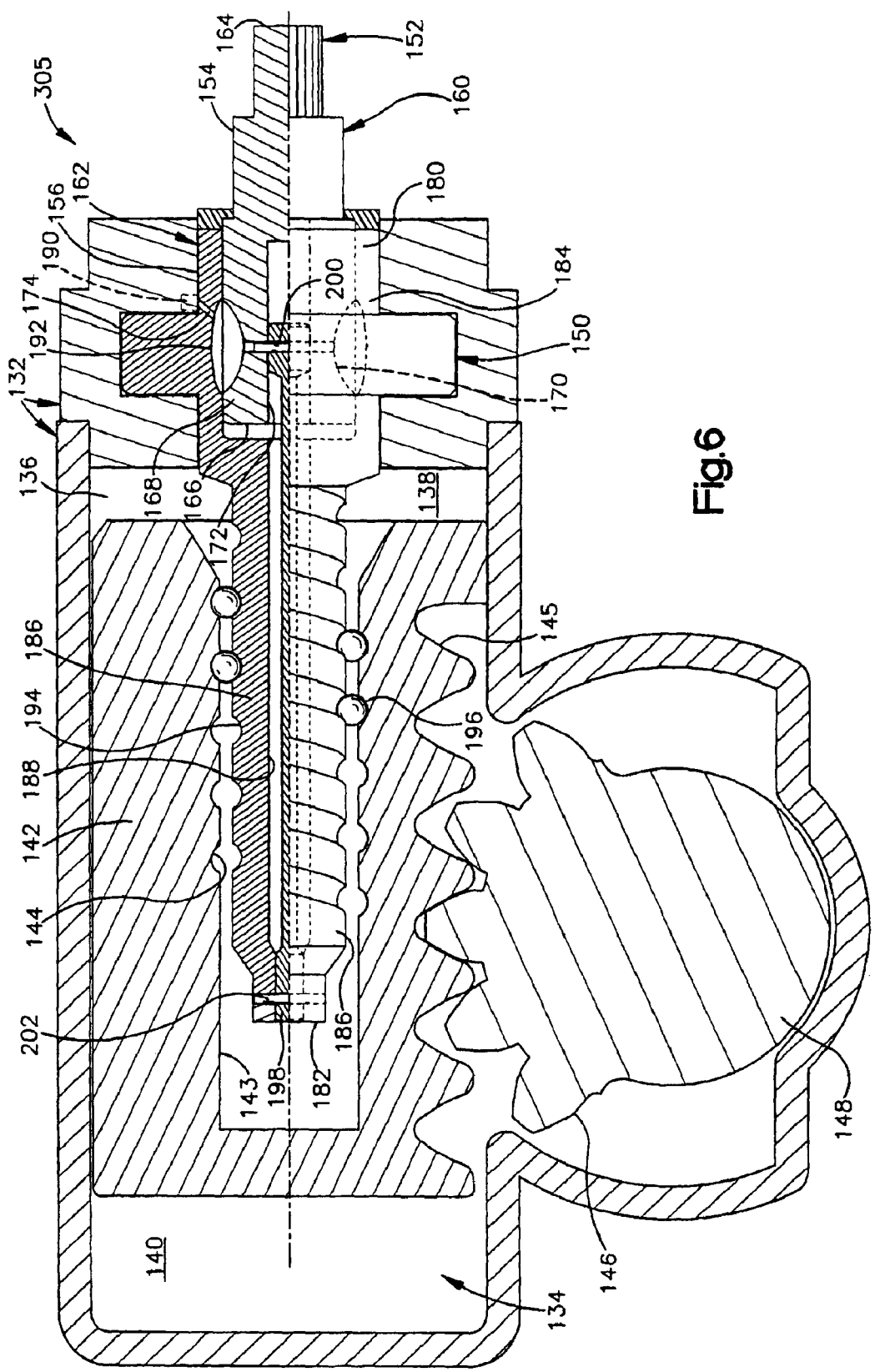
FIG. 6 is a sectional view of another component of the steering apparatus of FIG. 3.

The steering gear 305 is an integral hydraulic power steering gear similar to the steering gear of FIG. 2 and the same reference numbers used in describing the steering gear of FIG. 2 are used to describe the steering gear of FIG. 6. The steering gear of FIG. 6 includes a two-piece housing 132 (FIG. 6) having a hydraulic power cylinder 134. The power cylinder 134 comprises a chamber 136 divided into two chamber portions 138 and 140, respectively, by a piston 142. The piston 142 includes an inner bore 143 with a helical groove 144. The piston 142 also has a set of external teeth 145 which mesh with a sector gear 146. The sector gear 146 is fixed to an output shaft 148 which extends outwardly from the housing 132. The output shaft 148 is connected to a pitman arm 125 (FIG. 3) which, in turn, is connected via steering linkage (not shown) to the steerable wheels to steer the vehicle. As the piston 142 moves in the chamber 136, the output shaft 148 is rotated to operate the steering linkage, which turns the steerable wheels of the vehicle.

A hydraulic control valve assembly 150 controls the flow of pressurized hydraulic fluid between a hydraulic circuit including a hydraulic pump (not shown) and one of the chamber portions 138 and 140 to control the direction and amount of steering. The valve assembly 150 is actuated by the shaft 102 of the electric motor 100.

The valve assembly 150 comprises first and second valve members 154 and 156, respectively. The first valve member 154 comprises a valve core 160 and the second valve member 156 comprises a valve sleeve 162. The valve core 160 is located coaxially within the valve sleeve 162 and is supported for rotation by the valve sleeve. The valve core 160 is formed integrally as one piece with the input shaft 152. The valve core 160 has oppositely disposed first and second end portions 164 and 166, respectively, and a valve section 168 between the end portions. The first end portion 164 of the valve core 160 projects beyond the valve sleeve 162 and the second end portion 166 of the valve core lies within the valve sleeve.

The valve section 168 of the valve core 160 has a plurality of circumferentially spaced, axially extending grooves 170 as is known in the art. A first portion of the grooves 170 are fluidly connected with an internal passage 172 extending from the valve section 168 of the valve core 160 to the second end portion 166. The internal passage 172 communicates via passages (not shown) with the return line of a hydraulic pump circuit (not shown). A second portion of the grooves 170 are in fluid communication with a plurality of passages 174 in the valve sleeve 162.

The valve sleeve 162 has oppositely disposed first and second ends 180 and 182, respectively. The valve sleeve 162 further includes a sleeve section 184 adjacent the first end 180 and a ball screw section 186 adjacent the second end 182. An axially extending passage 188 extends from the first end 180 of the valve sleeve 162 through the sleeve section 184 and the ball screw section 186 to the second end 182.

The first end 180 of the valve sleeve 162 includes first and second lugs (not shown) that are disposed in diametrically opposed cut-outs (not shown) in the valve core 160. Upon rotation of the valve core 160 of between 2° and 8° relative to the valve sleeve 162, the lugs engage the cut-outs in the valve core to cause the valve sleeve to be rotated along with the valve core. Such rotation of the valve sleeve 162 causes the piston 142 to move axially in the chamber 136 and, hence, allows for manual steering of the vehicle even if a loss in hydraulic fluid pressure has occurred.

The sleeve section 184 of the valve sleeve 162 includes the plurality of passages 174 which extend from the outer circumference of the sleeve section to the inner circumference. The passages 174 communicate with an annular chamber 190 in the housing 132 which is fluidly connected to the hydraulic pump. A plurality of axially extending grooves 192 are formed in the inner surface of the valve sleeve 162 as is known in the art. The grooves 192 fluidly communicate with the second portion of the grooves 170 in the valve core 160. Further, a first portion of the grooves 192 in the valve sleeve 162 are fluidly connected via passages (not shown) with the first chamber portion 138 in the housing 132, and a second portion of the grooves 192 fluidly connected via passages (not shown) with the second chamber portion 140 in the housing. As is known in the art, when the valve core 160 is rotated relative to the valve sleeve 162, hydraulic fluid is ported through the grooves 170 and 192 and associated passages to one of the chamber portions 138 and 140, while the hydraulic fluid is vented from the other chamber portion, thereby causing the piston 132 to move accordingly.

The ball screw section 186 of the valve sleeve 162 includes a helical groove 194 formed on its outer periphery. A plurality of balls 196 are located in the helical groove 140. The balls 196 are also located in the helical groove 144 in the bore 143 formed in the piston 142. As is well known in the art, axial movement of the piston 142 causes the ball screw portion 186 to rotate which, in turn, causes the rest of the valve sleeve 162 to rotate.

A torsion bar 198 connects the valve core 160 and the valve sleeve 162. One end of the torsion bar 198 is connected by a pin 200 to the valve section 168 of the valve core 160, while the other end of the torsion bar extends through the passage 188 in the valve sleeve 162 and is connected by a pin 202 adjacent the second end 182 of the valve sleeve.

The hydraulic steering gear 130 further includes a plurality of output position sensors 210 (FIG. 5) for sensing rotation of the output shaft 148. The position sensors 210 are of the non-contacting type having no parts which slidingly engage each other. There are multiple output position sensors 210 for redundancy purposes. The position sensors 210 generate a second signal corresponding to the rotation of the steering gear output shaft 148 and provide the second signal to the ECU 303. The ECU 303 compares the second signal to the first signal and adjusts the control of the electric motor 304 depending on the position of the steerable wheels 306 versus the position that the steering wheel 301 is commanding the steerable wheels to take.

The steering apparatus 300 disclosed above has redundant power supplies 310 and 312, redundant drive circuits 318 and 320 which control redundant windings 336 and 340, respectively, in an electric motor, and redundant output position sensors 210 to provide the steering apparatus with fail-safe capability.

Figure 7:
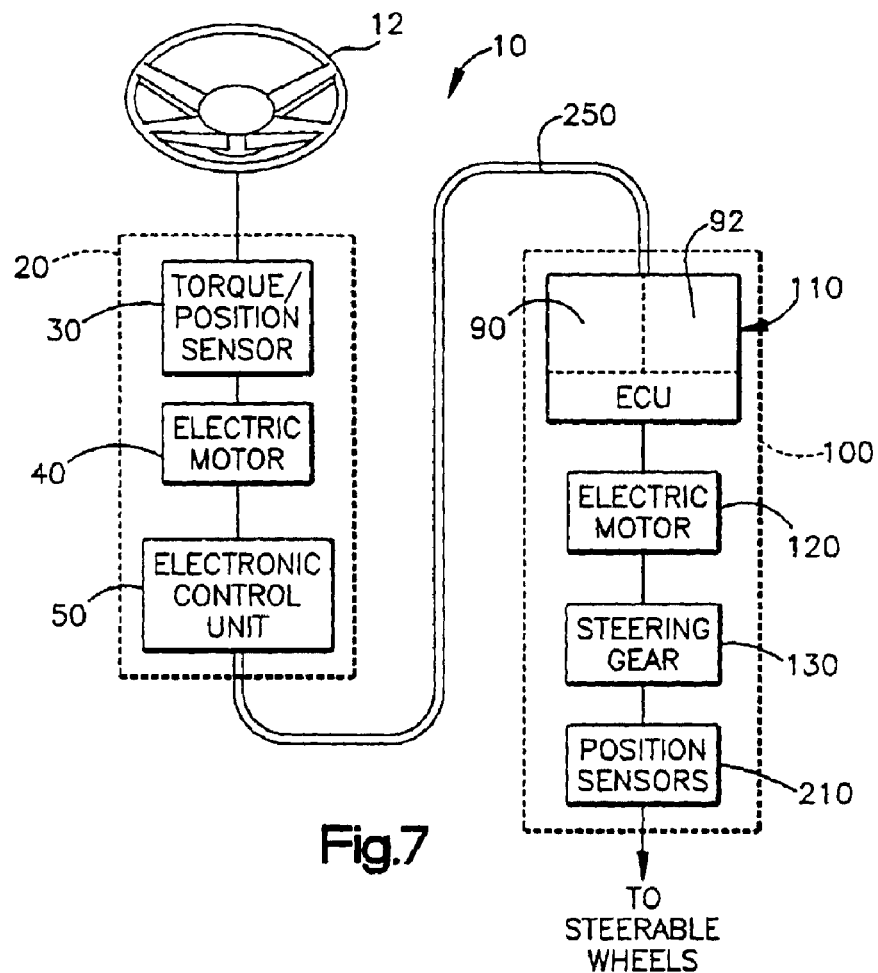
FIG. 7 is a schematic block diagram of a vehicle steering apparatus constructed in accordance with another embodiment of the present invention.

As representative of another embodiment of the invention, FIG. 7 schematically illustrates a steering apparatus similar to the steering apparatus of FIG. 1. Reference numbers used in FIG. 1 are used in FIG. 7 to designate corresponding parts. As shown in FIG. 7, a steering apparatus 10 comprises a vehicle steering wheel 12, a first assembly 20, a second assembly 100 operatively coupled to steerable wheels (not shown) of a vehicle, and a signal transmitting conductor 250 extending between the first and second assemblies. The vehicle steering wheel 12 is of known construction and is manually rotatable by a vehicle operator. The first assembly 20 is operatively coupled to the vehicle steering wheel 12 in a known manner (not shown).

The first assembly 20 includes a torque/position sensor 30, an electric motor 40, and a first electronic control unit (ECU) 50. These three components of the first assembly 20 are integrated into a single unit. The torque/position sensor 30, shown only schematically in FIG. 7, is operable to sense applied torque and angular position of the steering wheel 12 by the operator. The torque/position sensor 30 preferably comprises an optical sensor having relatively rotatable first and second disks (not shown). Two sets of light emitters (not shown) are positioned to emit light toward the disks. Two sets of light receivers (not shown) are positioned to receive light that shines through the disks. The sensor 30 is able to determine the amount of torque applied to the steering wheel and the angular position of the steering wheel based on the received light. It is contemplated that the torque/position sensor 30 could be some other type of sensor, rather than an optical sensor. It is further contemplated that the first assembly 20 could include one or more additional torque/position sensors 30 for redundancy in case a problem develops with the primary sensor.

The electric motor 40, hereinafter referred to as the steering feel motor, is operatively coupled to the steering wheel 12 to provide resistance to rotation of the steering wheel and thereby provide steering feel to the vehicle operator. The steering feel motor 40 is controlled by the first ECU 50 in response to signals received from the second assembly 100 as described further below.

The first ECU 50 is operatively coupled with the torque/position sensor 30 and generates a first signal corresponding to the applied torque and angular position of the steering wheel 12 sensed by the torque/position sensor 30. Further, the first ECU 50 has multiplexing capability and is operable to send the first signal to the second assembly 100 via the signal transmitting conductor 250. Preferably, the first signal is an optical signal and the signal transmitting conductor 250 is a high speed fiber optic cable.

The second assembly 100 includes a second electronic control unit (ECU) 110, an electric motor 120, and a power steering gear 130 for turning the steerable wheels to effect steering of the vehicle. These three components of the second assembly 100 are integrated into a single unit in order to minimize the number of electrical contacts and maximize reliability. The second ECU 110 is operable to receive the first signal transmitted by the fiber optic cable 250. The second ECU 110 includes first and second drive circuits 90 and 92. The second ECU 110, through one or both of the drive circuits 90 and 92, controls the flow of electrical current to the electric motor 120 based on the first signal.

The electrical motor 120 is a three phase brushless motor having a rotor 401 (FIG. 8) and a stator 402. An output shaft 403 (FIG. 9) is connected to one end of the rotor 401. A first set of permanent magnets 406 are mounted on the rotor and extend in an annular array. A second set of permanent magnets 407 also extend in an annular array about the rotor 401. The second set of magnets 407 is spaced axially from the first set of magnets 406.

A first set of windings 408 is secured to the stator 408 in the electric motor 120. The first set of windings 408 align radially with the first set of magnets 406 on the rotor 401. The first set of windings 408 are energizable by current from the first drive circuit 90 in the second ECU 110 to cause the rotor 401 to rotate. A second set of windings 409 is secured to the stator 402 in the electric motor 120. The second set of windings 409 align radially with the second set of magnets 407 on the rotor 401. The second set of windings 409 are energizable by current from the second drive circuit 92 in the second ECU 110 to cause the rotor 401 to rotate. The first and second sets of windings 408 and 409 can be independently energized by the first and second drive circuits 90 and 92, respectively, and thus provide the electric motor 120 with dual drive capability, with the second ECU 110 providing electronic commutation.

The steering gear 130 includes a linearly movable steering member 432 (FIG. 9) that extends axially through a housing 431. The steering member 432 is linearly (or axially) movable along an axis 434. The steering member 432 includes a screw portion 440 having an external thread convolution. The steering member 432 is connected with steerable wheels (also not shown) of the vehicle through tie rods 442 located at the distal ends of the steering member. Linear movement of the steering member 432 along the axis 434 results in steering movement of the steerable wheels as is known in the art.

The housing 431 has a generally cylindrical configuration including an axially extending side wall 450 centered on the axis 434. A radially enlarged section 452 of the housing 431 is located at the right end (as viewed in FIG. 9) of the housing 431. The radially enlarged section 452 of the housing 431 defines an annular chamber 454. An outboard housing 458 is attached, in a manner not shown, to the radially enlarged section 452 of the housing 431 and closes the chamber 454.

A ball nut assembly 470 is located in the chamber 454 in the radially enlarged section 452 of the housing 431 and encircles the screw portion 440 of the steering member 432. The ball nut assembly 470 includes a ball nut 472, a plurality of force transmitting members 474, a first bearing assembly 476, a gear member 478, and a lock nut 480. The lock nut 480 screws onto the ball nut 472 to axially secure the parts of the ball nut assembly 470.

The plurality of force-transmitting members 474 comprise balls disposed between the internal screw thread convolution of the ball nut 472 and the external thread convolution on the screw portion 440 of the steering member 432. The ball nut assembly 470 includes a recirculation passage (not shown) for recirculating the balls upon axial movement of the steering member 432 relative to the ball nut assembly. The ball nut assembly 470 provides a gear reduction ratio as is known in the art.

The electric motor 120 is mounted to a radially extending gearbox portion 422 of the housing 431. The gearbox portion 422 extends from the radially enlarged section 452 of the housing 431. The gearbox portion 422 contains meshed first and second gears 424 and 426, respectively. The first gear 424 is the gear member 478 of the ball nut assembly 470. The second gear 426 is connected for rotation with the motor output shaft 403 extending from the electric motor 120. The meshed first and second gears 424 and 426 provide a gear reduction ratio between the motor output shaft 103 of the electric motor 120 and the ball nut assembly 470. When the gear reduction ratio of the ball nut assembly 470 is combined with the gear reduction ratio of the gears 424 and 426, an overall gear reduction ratio for the steering assembly 10 is provided.

In the illustrated embodiment of the invention, the motor 120 extends transverse to the steering member 432 at a right angle. It is contemplated, however, that the motor 120 could lie parallel to the steering member 432 or at a different angle, such as 45°, relative to the steering member.

Figure 9:
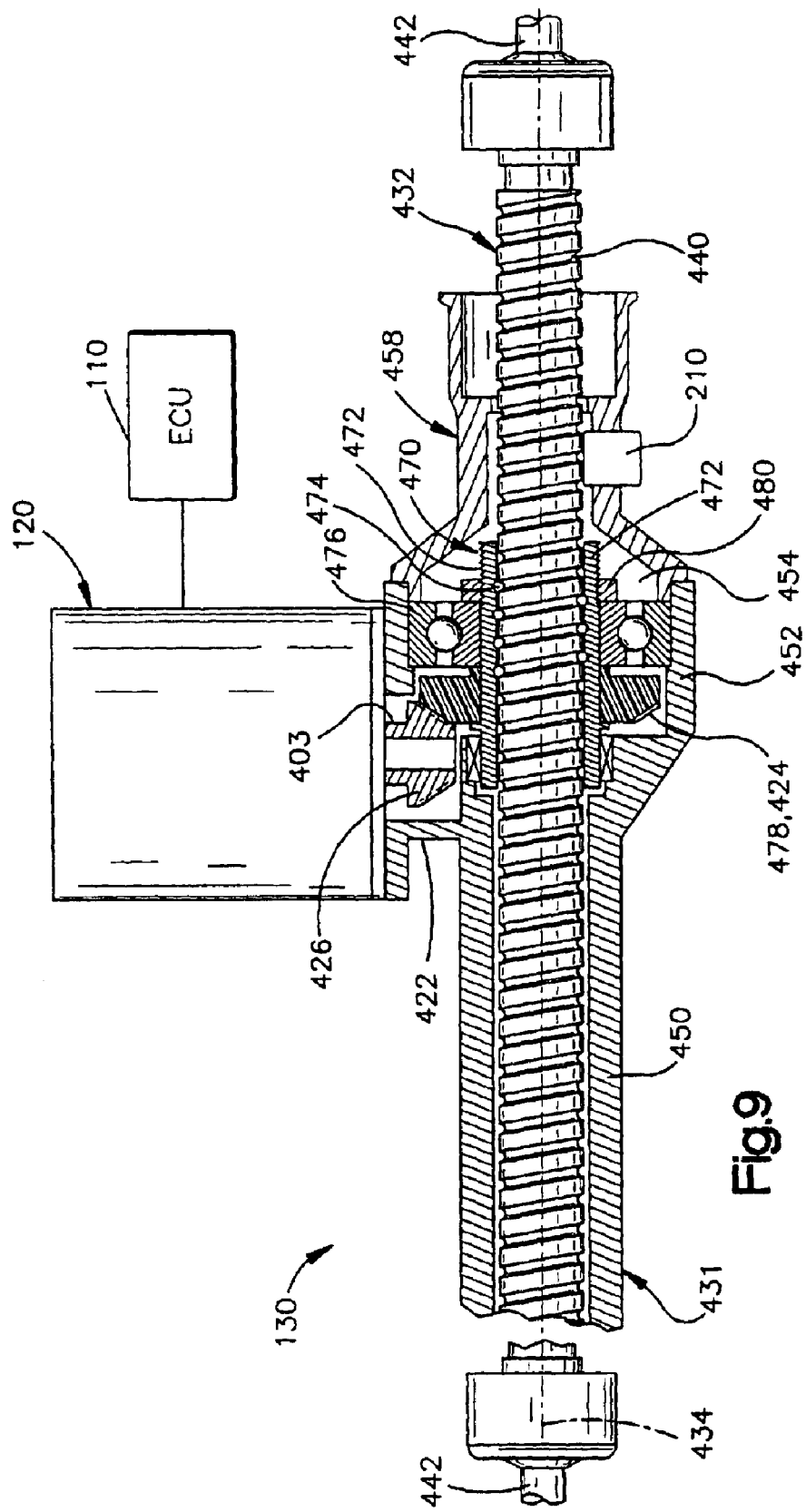
FIG. 9 is a sectional view through another component of the steering apparatus of FIG. 7.

The steering gear 130 further includes a plurality of output position sensors 210, illustrated schematically in FIGS. 7 and 9, for sensing the amount of rotation of the ball nut 470. The position sensors 210 are shown in FIG. 7 as part of the second assembly 100. The position sensors 210 are non-contacting sensors. There are a multiplicity of output position sensors 210 for redundancy purposes. The second ECU 110 is operable to generate a second signal corresponding to the rotation of the ball nut 470 sensed by the position sensors 210. Further, the second ECU 110 has multiplexing capability and is operable to send the second signal to the first assembly 30 via the fiber optic cable 250. Preferably, the second signal is an optical signal.

The second signal is received by the first ECU 50. The first ECU 50 controls the steering feel motor 40 in response to the second signal. The multiplexing capability of the first and second electronic control units 50 and 110 allows the first and second signals to be transmitted practically simultaneously using the fiber optic cable 250. The electronic control units 50 and 110 can vary the intensity of the first and second signals and/or the frequency phase of the signals in order to constantly exchange signal information during operation of the vehicle.

The second signal thus provides feedback to the vehicle operator, in the form of resistance to rotation of the steering wheel 12 by the steering feel motor 40, of the actual position of the steerable wheels upon manual rotation of the steering wheel. In addition, the first ECU 50 could be programmed to increase the resistance to rotation of the steering wheel 12 with vehicle speed.

It is contemplated that the apparatus 10 could include one or more additional assemblies, similar to the second assembly 100, so that each steerable wheel has its own steering gear 130 in order to provide "perfect Ackermann" steering.

Figure 8:
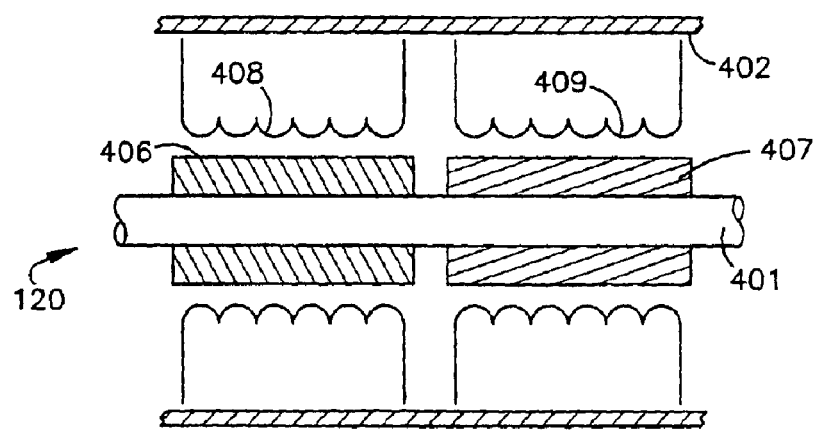
FIG. 8 is a schematic sectional view of a component of the apparatus of FIG. 7.

From the above description of the embodiment of FIGS. 7–9, those skilled in the art will perceive improvements, changes and modifications. For example, ordinary electrical signals and appropriate wiring could be used to exchange steering position information between the first and second assemblies in place of the optic signals and fiber optic cable discussed above. Such improvements, changes and modifications within the skill of the art are intended to be covered by the appended claims.

Having described the invention, I claim:

1. An apparatus for turning steerable wheels of a vehicle in response to turning of a steering wheel of the vehicle, said apparatus comprising:

a first assembly operatively connected to the steering wheel, said first assembly including a sensor apparatus which senses torque applied to the steering wheel and an angular position of the steering wheel, a first electric motor operatively coupled with the steering wheel to provide resistance to rotation of the steering wheel, and a first electronic control unit connected with said first electric motor, said first electronic control unit is operable to generate a first optical signal which is a function of the sensed torque applied to the steering wheel and the sensed angular position of the steering wheel;

a second assembly operatively coupled to a steering mechanism connected with the steerable wheels of the vehicle, said second assembly including a sensor apparatus which is connected with the steering mechanism and is operable to sense a position of a portion of the steering mechanism connected to the steerable vehicle wheels to thereby sense a position of the steerable vehicle wheels, a second electric motor which is connected with the steering mechanism and is operable to effect operation of the steering mechanism to change the position of the steerable vehicle wheels, and a second electronic control unit connected with said second electric motor, said second electronic control unit is operable to generate a second optical signal which is a function of the sensed position of said portion of the steering mechanism; and a fiber optic cable connected with said first and second electronic control units, said fiber optic cable is effective to conduct said first optical signal from said first electronic control unit to said second electronic control unit to enable said second electronic control unit to control operation of said second electric motor as a function of the sensed torque applied to the steering wheel and the sensed angular position of the steering wheel, said fiber optic cable is effective to conduct said second optical signal from said second electronic control unit to said first electronic control unit to enable said first electronic control unit to control operation of said first electric motor as a function of the position of said portion of the steering mechanism.

2. An apparatus as set forth in claim 1 wherein said first and second electronic control units have multiplexing capabilities to enable said first electronic control unit to send the first optical signal which is a function of the sensed torque applied to the steering wheel and the sensed angle of rotation of the steering wheel over said fiber optic cable to said second electronic control unit while said second electronic control unit is sending the second optical signal which is a function of the sensed position of said portion of the steering mechanism over said fiber optic cable to said first electronic control unit.

3. An apparatus as set forth in claim 2 wherein said second electric motor is a dual drive electric motor having a rotor with first and second sets of permanent magnets which are rotatable together about an axis of rotation of said second electric motor and a stator which extends around said rotor and includes first and second sets of windings, said first set of windings extends around said first set of permanent magnets and said second set of windings extends around said second set of permanent magnets.

4. An apparatus as set forth in claim 3 wherein said second electronic control unit includes a first motor drive circuit which is operable to direct electrical current to said first set of windings and a second motor drive circuit which is operable to direct electrical current to said second set of windings.

5. An apparatus for turning steerable wheels of a vehicle in response to turning of a steering wheel of the vehicle, said apparatus comprising:

a steering mechanism connected with the steerable vehicle wheels, said steering mechanism includes an axially movable steering member and a ball nut which is rotatable about a longitudinal central axis of said steering member;

a first assembly operatively connected to the steering wheel, said first assembly including a sensor apparatus which senses torque applied to the steering wheel and an angular position of the steering wheel, a first electric motor operatively coupled with the steering wheel to provide resistance to rotation of the steering wheel, and a first electronic control unit connected with said first electric motor, said first electronic control unit is operable to generate a first signal which is a function of the sensed torque applied to the steering wheel and the sensed angular position of the steering wheel;

a second assembly connected with said first assembly and operatively coupled to said steering mechanism, said second assembly including a sensor apparatus which is connected with the steering mechanism and is operable to sense a position of a portion of the steering mechanism connected to the steerable vehicle wheels to thereby sense a position of the steerable vehicle wheels, a second electric motor which is connected with the steering mechanism and is operable to effect operation of the steering mechanism to change the position of the steerable vehicle wheels, and a second electronic control unit connected with said second electric motor, said second electronic control unit is operable to generate a second signal which is a function of the sensed position of said portion of the steering mechanism; and a signal conductor connected with said first and second electronic control units, said signal conductor is effective to conduct said first signal from said first electronic control unit to said second electronic control unit to enable said second electronic control unit to control operation of said second electric motor as a function of the sensed torque applied to the steering wheel and the sensed angular position of the steering wheel, said signal conductor is effective to conduct said second signal from said second electronic control unit to said first electronic control unit to enable said first electronic control unit to control operation of said first electric motor as a function of the position of said portion of the steering mechanism, said second electric motor is a dual drive electric motor having a rotor with first and second sets of permanent magnets which are rotatable together about an axis of rotation which extends transverse to a central axis of said steering member and a stator which extends around said rotor and includes a first set of windings which extends around said first set of permanent magnets and a second set of windings which extends around said second set of permanent magnets, said second electronic control unit includes a first motor drive circuit which is operable to direct electrical current to said first set of windings to effect rotation of said rotor about the axis of rotation which extends transverse to the central axis of said steering member and a second motor drive circuit which is operable to direct electrical current to said second set of windings to effect rotation of said rotor about the axis of rotation which extends transverse to the central axis of said steering member.

6. An apparatus as set forth in claim 5 wherein said signal conductor is a fiber optic cable, said first and second electronic control units have multiplexing capabilities to enable said first electronic control unit to send the first signal over said fiber optic cable to said second electronic control unit while said second electronic control unit is sending the second signal over said fiber optic cable to said first electronic control unit.

* * * * *